June 2, 1964
S. KWASEK
3,135,541
CONVERTIBLE TOP LATCHING MECHANISM
Filed Nov. 8, 1962
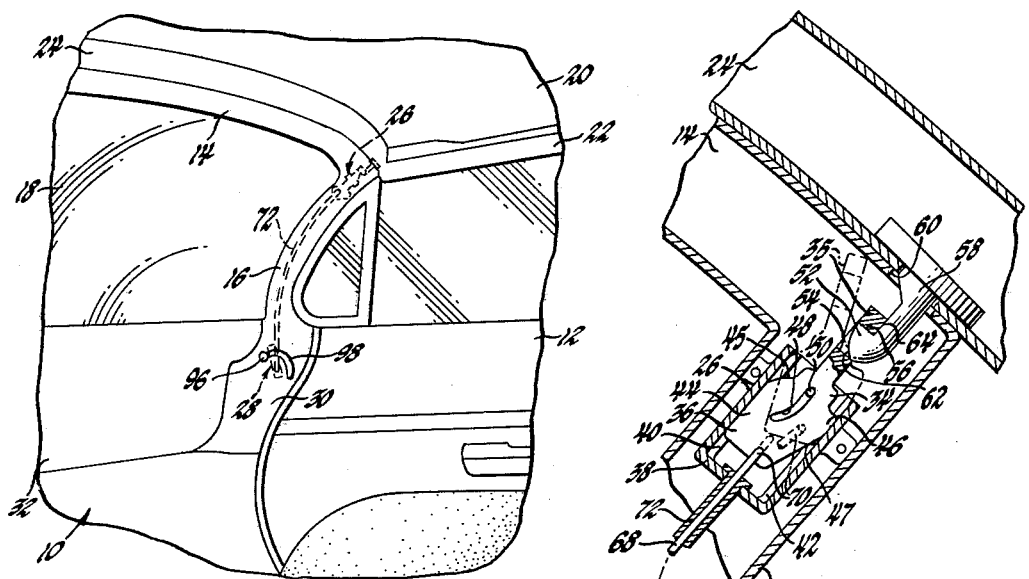
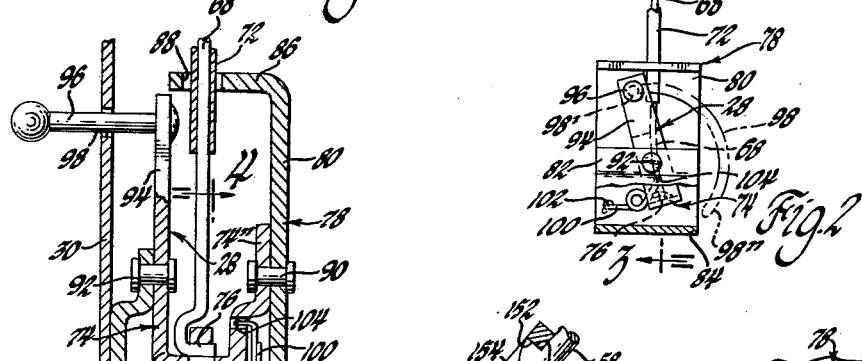
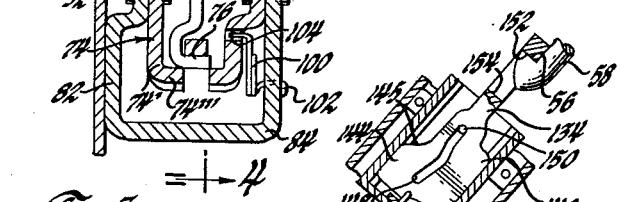
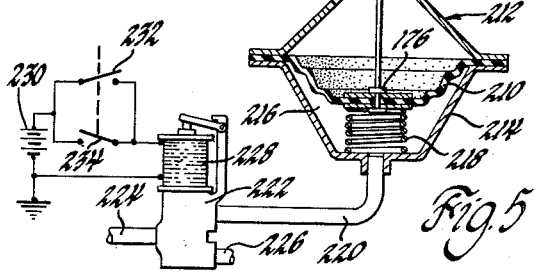
INVENTOR.
Stanley Kwasek
BY
E. E. James
ATTORNEY

3,135,541
CONVERTIBLE TOP LATCHING MECHANISM
Stanley Kwasek, Northville, Mich., assignor to General Motors Corporation, Detroit, Mich., a corporation of Delaware
Filed Nov. 8, 1962, Ser. No. 236,335
11 Claims. (Cl. 292—64)

This invention relates to latch mechanisms particularly adapted to secure a convertible top to enclose the passenger compartment of an automotive vehicle.

In convertible automobiles, cooperating top latching means have been generally mounted laterally of the windshield header and the juxtaposable top supporting roof rail to permit manual latching and unlatching operation by an occupant within the vehicle. In the limited space available under the top supporting rail, such mechanisms have been somewhat difficult to align and operate and have often been incapable of providing the leverage required to seal the top supporting rail properly with respect to the windshield header. The protruding elements of such top latching mechanisms also present substantial hazard to occupants under rapid braking deceleration and collision impact conditions.

The instant invention contemplates the use of a simple top latching mechanism operably enclosed within the windshield mounting pillars and capable of remote operation by either manual or top coordinated power means to provide adequate top sealing loads. In several illustrative embodiments herein shown and described, the top latching mechanisms of the invention each include a latching member mounted within the windshield pillar for limited reciprocation and pivotal translation between a latch engaging retracted position and an extended latch disengaging position. After closing movement of the top supporting rail proximate to the windshield mounting header, remote manual or power actuation of the latching member toward its retracted position effects lateral swinging thereof into latch loading and locking engagement with a hook shaped latch keeper carried by the top supporting rail and projecting into the latch housing windshield pillar.

The foregoing and other objects, advantages and features of the invention will be apparent from the following description of the several illustrative embodiments, having reference to the accompanying drawing, in which:

FIGURE 1 is a perspective fragmentary view of a passenger compartment interior of a convertible automobile and shows the operational environment and installation of a manually operable embodiment of the invention;

FIGURE 2 shows spaced portions of the top latching mechanism of FIGURE 1 broken away and enlarged in sectional detail;

FIGURE 3 is a sectional view taken in the direction of the arrows and in the plane of the line indicated at 3—3 of FIGURE 2 and shows the remote overcenter latch operating and locking control lever of FIGURES 1 and 2 in greater sectional detail;

FIGURE 4 is an enlarged view corresponding to a portion of FIGURE 2 further broken away and sectioned to detail the latch operating lever connection substantially in the direction of the arrows and in the plane of the line indicated at 4—4 in FIGURE 3; and FIGURE 5 is a view similar to FIGURE 2 showing a modified form of the invention wherein a vacuum motor is coordinated with power top operating control means to coincidentally and remotely actuate spaced top latching mechanisms.

Referring more particularly to FIGURE 1, an interior body portion of a convertible is indicated generally by the reference numeral 10 and defines a passenger compartment 12 partially shown in perspective. The vehicle body includes a header 14 extending laterally between and cooperating with two hollow pillars 16, one shown, to mount the upper and opposite side edges of a windshield 18. A fabric convertible top 20 is supported and carried by an extensible folding roof linkage, including a side roof rail member 22 and a forward roof rail member 24, between a top retracted position and an extended position closing the passenger compartment of the vehicle. In its top closed position, the forward roof supporting rail 24 is brought into proximate engagement with the windshield supporting header and pillars.

In accordance with certain aspects of the invention, a top latching mechanism 26 is housed within the upper portion of each windshield supporting pillar 16. In the embodiment shown somewhat diagrammatically in FIGURE 1 and in detail in FIGURES 2–4, the latching mechanism 26 is connectable through its mounting pillar to an overcenter-locked actuating lever 28 remotely pivoted within and accessible through the passenger compartment side wall 30 adjacent the end of the transverse dash panel 32.

As shown in the upper portion of FIGURE 2, the pillar enclosed latching mechanism 26 includes a shiftable latch member 34 having an upper latching portion 35 and a lower guide plate 36. A cup-shaped guide housing 38 is suitably secured and enclosed within the upper portion of the windshield pillar 16 and has two longitudinally opposed inwardly facing grooves 40 and 42. These grooves slidably guide feet 44 and 46 defined by the laterally opposite edges of the guide plate portion of the latching member 34. The latch guiding feet 44 and 46 are oppositely curved at 45 and 47 as shown so that the latching member may be reciprocably actuated from a retracted latch engaging position, shown in full line in FIGURE 2, and rotated slightly with respect to the guide housing to a pivotally tilted latch disengaging position shown in broken lines in FIGURE 2. The guide plate portion is also provided with a curved cam slot 48. This cam slot slidably engages and cooperates with a pivot pin 50 extending transversely between the side walls of the guide housing to permit and assist in effecting desired movement of the latching member 34. As the latch member 34 is actuated toward its retracted latch engaging position, a latching shoulder 52 defined by an opening 54 through its upper portion is engageable with a mating shoulder 56 formed on a cooperating latch hook on keeper 58.

The latch keeper 58 is rigidly attached to the top supporting rail 24 and projects into an opening 60 in the upper end of the windshield pillar 16 upon top closing movement of the rail proximate the windshield header. If the latching member 34 is in its retracted position when such top closing movement occurs, a cam surface 62 on the keeper slidably engages the adjacent upper edge 64 of the latching member 34. If permitted by the latch operating means, such cam engagement effects limited rotation of the latching member 34 pivotally about its curved guide edge 48 in a latch disengaging direction. Such limited latch rotation permits movement of the rail and keeper to their top sealing closed positions whereupon the latching member is counterrotated into latching engagement with the keeper.

A pillar enclosed Bowden wire 68 provides a flexible operative connection between the latch mechanism 26 and the overcenter-locked latch actuating lever 28. As shown in FIGURES 1 and 2, the Bowden wire is pivotally connected at 70 to the guide base end of the latching member 34. A sheath 72 is supported at its upper end by the closed end wall of the guide housing 38 and slidably embraces the wire intermediate its ends. Both the wire and its sheath extend downwardly through the hollow windshield mounting pillar 16 to a point within the passenger compartment side wall 30 adjacent the actuating lever 28. As shown in FIGURES 2-4, the actuating lever 28 has a U-shaped arm 74' and 74" joined by a bight portion 74''' pivotally connected at 76 to the lower end of the Bowden wire 68.

A lever mounting bracket 78 is suitably supported with respect to the compartment wall 30. This bracket has two spaced side walls 80 and 82 joined by a bottom wall 84. The bracket side wall 80 substantially exceeds the other bracket side wall 82 in height and upwardly supports a laterally extending upper wall 86. This upper wall has an opening 88 spacedly embracing and piloting the lower ends of the Bowden wire and its sheath. The spaced arm portions of the lever 28 are interposed between the bracket side walls 80 and 82 and coaxially pivoted at 90 and 92 in bearing engagement therewith. The lever arm portion 74' extends beyond the pivot 92 to provide a second lever arm 94 having a manually operable knob or handle 96. This actuating knob projects through an arcuate slot or opening 98 in the side wall 30 into the passenger compartment. As best seen in phantom broken lines in FIGURE 2, the opposite ends 98' and 98" of the arcuate opening 98 respectively limit pivotal actuation of the lever 28 between a latch locking overcenter position shown in full lines in FIGURES 2 and 4 and a latch disengaging position wherein the operating knob 96 engages the distal end 98" of the arcuate opening. A helical overcenter spring 100 is seated at 102 in an opening through the bracket side wall 80 in spaced relation to the pivotal axis of the lever 28. The opposite end of the spring 100 is seated at 104 in an opening through the lever arm portion 74". The bracket spring seat 102 is located so that the line of force of the spring 100 passes on opposite sides of the lever mounting pivot pin 92 upon actuation of the lever 28 between its two extreme limited positions. The spring thus serves to resiliently maintain the lever 28 alternatively in either its extreme or disengaging positions.

Movement of the actuating lever 28 to its extreme latching position carries the pivotal connection 76 of the lever and Bowden wire to an overcenter position slightly beyond the pivotal axis of the lever. This overcenter position locks the Bowden wire and the latch member 34 in their retracted latch engaging positions. As the lever 28 is rotated in a latch disengaging clockwise direction, as viewed in FIGURES 2 and 4, its pivotal connection to the Bowden wire is carried overcenter from its latch locking position and subsequently slides the connecting Bowden wire 68 upwardly through its sheath. Such Bowden wire movement slides the latching member 34 upwardly of the guide member into camming engagement between the opening 54 and the keeper defined cam surface 62. Such engagement initiates lateral swinging of the latch member 34 as permitted by the arcuate portions of the guide feet 44 and 46. Subsequent lateral swinging of the latch member is further assisted by the cooperating cam slot 48 and pivot pin 50 as the latch member is further urged upwardly to its disengaged position shown in broken lines in FIGURE 2 by its Bowden wire actuating connection. Latch member 34 thus releases the keeper 58 to permit opening retraction of the convertible top.

In the embodiment of the invention partially and somewhat diagrammatically shown in FIGURE 5, the pillar mounted latching mechanism 126 is substantially the same as that previously described and need not be described in detail. Hence, reference numerals identifying corresponding portions of this slightly modified latch mechanism have been obtained by merely adding 100 to the reference numerals applied to the previous embodiment. In this embodiment, the latch member 134 has been modified from that previously described to permit further reciprocable movement from its retracted position prior to initiating lateral swinging toward its disengaged position. This has been accomplished by elongating the latch shoulder defining opening 154 through its upper latch portion, by elongating and otherwise modifying the curve of the cam slot 148, and by moving the oppositely curved portions 145 and 147 of the guide feet 144 and 146 closer to the pivotal connection 170 between the guide plate and the Bowden wire 168. A greater range of reciprocable movement is thus provided adjacent the fully retracted latch engaging position of the member 134 and prevents incidental unlatching rotation of the latching member which might otherwise be permitted by the actuating means of this embodiment and result from undue flexure of the windshield mounting members and of the top supporting rail member.

The end of the Bowden wire 168 distal from the latch member 134 is suitably connected at 176 to the diaphragm 210 of a fluid pressure operated motor 212. The diaphragm 210 cooperates with a housing member 214 to define an expansible chamber 216. A spring 218 is compressively interposed between the diaphragm 210 and the housing member 214 and normally acts to bias the diaphragm, the Bowden wire and the latching member 134 upwardly to their latch disengaging positions. In the illustrative embodiment, the expansible chamber 216 is connected through a conduit 220, a control valve 222 and a conduit 224 to a second vacuum motor, not shown, operable to actuate a second top latching mechanism similar to 126 mounted in the left-hand windshield pillar. The control valve 222 is selectively operable to connect the chamber supply conduits 220 and 224 alternately to the atmosphere or to a conduit 226 connected to a suitable vacuum source, not shown. Such a source may include a vacuum reservoir connected through a check valve to the intake manifold of the vehicle engine. Whenever the valve 222 is operated to apply a vacuum to the expansible chamber 216, atmospheric pressure acting on the upper side of the diaphragm 210 forces it downwardly against the biasing action of the spring 218. The Bowden wire 168 and the latch member 134 are thus actuated to their retracted latch engaging positions. When the chamber 216 is connected to the atmosphere by operation of the valve 222, the equalizing of the fluid pressure applied to opposite sides of the diaphragm 210 permits the spring 218 to bias the Bowden wire upwardly to shift the latch member to its laterally displaced unlatching position.

The valve 222 may be suitably mounted on the dash panel 32 for selective manual operation by the vehicle driver or other occupants. In the illustrative embodiment, however, this valve is operable between its two fluid pressure supply positions by selective energization and deenergization of a solenoid 228 coordinated with opening and closing operation of a conventional top operating power means. For this purpose, the valve 222 is normally maintained in its vacuum supplying position whenever the solenoid 228 is deenergized. The latch member 134 is thus normally maintained in its retracted latching position. The solenoid 228 is connectable in series with the vehicle electrical power supply indicated at 230 by the alternate closing of two switches 232 and 234. These switches are gang connected to a conventional top operating control switch and are normally maintained therewith in a neutral opened position. Movement of the top operating control switch to energize the top operating power means, alternately to raise and close the top or to open and lower the top, closes one of the solenoid energizing switches 232 or 234 to thereby vent the vacuum motor chamber 216 to atmosphere. The latching member is thus spring actuated to its unlatched position during power operation of the top in either direction. Subsequent release of the top operating control switch to its neutral position returns both of the solenoid energizing switches 232 and 234 to their open neutral positions thereby disenergizing the valve operating solenoid. This in turn permits return of the valve to its position supplying vacuum to the latch actuating motor 212. If the top has been raised to its closed position during energization of the top operating power means, the subsequent retraction of latching member 134 by the vacuum motor serves to effect top locking engagement with the latch keeper 64.

From the foregoing discription of the several illustrative embodiments, it will be seen that the invention provides a relatively simple concealed top latching mechanism capable of remote manual operation from an easily accessible location with a minimum of effort and/or capable of power operation coordinated with opening and closing movement of the convertible top. It will be further apparent that various changes, modifications and departures might be made in and from the illustrative embodiments without departing from the spirit and scope of the invention as defined in the following claims.

What is claimed is:

1. A convertible top latching mechanism for an automotive vehicle comprising
   a windshield mounting member,
   a top supporting member moveable proximate the windshield mounting member to close the convertible top with respect to the vehicle passenger compartment,
   a first latching member,
   means for mounting said first latching member for reciprocable and lateral swinging movement with respect to said windshield supporting member between a retracted latch engaging position and an extended latch disengaging position,
   means for selectively actuating said first latching member between its latch engaging and disengaging positions,
   and a second latching member carried by said top supporting member and normally engageable by said first latching member in its retracted position when said top supporting member is moved to its proximate top closed position,
   said second latching member having a cam surface thereon engageable with said first latching member and cooperating with said mounting means to initiate swinging movement of said first latching member when actuated toward its latch disengaging position.

2. A convertible top latching mechanism for an automotive vehicle comprising
   a windshield mounting member forwardly of the vehicle passenger compartment,
   a top supporting member moveable proximate the windshield mounting member in closing the top with respect to the vehicle passenger compartment,
   a first latching member having an opening therethrough adjacent one end defining a first latching shoulder,
   means mounting said first latching member within said windshield mounting member in spaced transverse relation to the opening therein for limited coincidental reciprocation and lateral swinging movement carrying said first latching shoulder between a retracted latch engaging position and a latch disengaging position,
   means for selectively actuating said first latching member between its latch engaging and disengaging positions,
   and a second latching member carried by said top supporting member and projecting into the windshield mounting member and defining a second latching shoulder thereon normally engageable with the latching shoulder of said first latching member when said top supporting member is moved to its proximate top closed position,
   said second latching member having a cam surface thereon engageable with said one end to cam said first latching member laterally of its retracted position upon movement of the top supporting member to its proximate top closed position, said cam surface being engageable with the latch opening through said first latching member during initial actuation toward its latch disengaging position and cooperating with said mounting means to cam said first latching member toward its latch disengaging position.

3. A convertible top latching mechanism for an automotive vehicle comprising
   a windshield mounting member forwardly of the vehicle passenger compartment,
   a top supporting member moveable proximate the windshield supporting member in closing the top with respect to the vehicle passenger compartment,
   a latching plate having a latch opening therethrough adjacent one end,
   means slidably and pivotally mounting said latching plate within said windshield mounting member in spaced relation to the latch opening end thereof for limited reciprocation and coincidental lateral swinging movement carrying said latch opening end between a retracted latch engaging position and a latch disengaging position,
   a latch engaging hook carried by said top supporting member and normally projecting into said windshield mounting member and engageable with the opening in the latching plate when said top supporting member is moved to its proximate top closed position,
   and means for selectively actuating said latching plate between its latch engaging and disengaging positions.

4. In a convertible top latching mechanism as set forth in claim 3, said
   latch engaging hook having a cam surface thereon cooperating with said mounting means and engageable with the latch opening end of the latching plate to initiate lateral swinging movement thereof when actuated toward its latch disengaging position.

5. A convertible top latching mechanism for an automotive vehicle including
   a windshield mounting member spaced above the vehicle body forwardly of a passenger compartment,
   a top supporting member moveable proximate the windshield mounting member when the convertible top is closed with respect to the passenger compartment,
   said windshield mounting member defining a housing opening toward the top closed position of said supporting member,
   a first latching member having an opening therethrough,
   means mounting said first latching member within said housing for reciprocable swinging translation laterally of the opening therein between a retracted latch engaging position and a laterally extended latch disengaging position,
   a second latching member carried by said top supporting member and insertable into said housing opening when said supporting member is moved to its proximate top closed position,
   said second latching member having a shoulder thereon normally engageable with the opening of said first latching member when actuated to its retracted latch engaging position,
   and said second latching member having a cam surface thereon engageable with said first latching member and cooperating with said mounting means to cam said first latching member toward its latch disengaging position alternatively upon movement of said supporting member toward its proximate top closed position and upon actuation of said first latching member toward its latch disengaging position.

6. In a convertible top latching mechanism as set forth in claim 5, means for remotely and selectively actuating said first latching member including an overcenter actuating lever accessible to said passenger compartment and operably connected through said window supporting member to actuate said first latching member between its latch engaging and disengaging positions.

7. In a convertible top latching mechanism as set forth in claim 5, power means mountable in spaced relation to the windshield mounting member, means for operably connecting said power means through the windshield mounting member to actuate said first latching member between its latch engaging and disengaging positions, and control means accessible to the passenger compartment and selectively operable to energize said power means to engage and disengage said latching members.

8. A convertible top latching mechanism for an automotive vehicle comprising a windshield mounting member, a top supporting member moveable proximate the windshield mounting member in closing the convertible top with respect to the vehicle passenger compartment, a first latching member, means mounting said first latching member within the windshield mounting member for reciprocation and coincidental swinging translation laterally of said windshield mounting member between a retracted latch engaging position and an extended latch disengaging position, a second latching member carried by the top supporting member and engageable by said first latching member upon movement to its retracted position when the top supporting member is in its proximate top closed position, and latch operating means accessible to the passenger compartment and operably connected through the window mounting member to actuate said first latching member selectively between its latch engaging and disengaging positions.

9. In a convertible top latching mechanism as set forth in claim 8, said latch operating means including an overcenter actuating lever pivotally mounted in spaced relation to said windshield mounting member and operably accessible within the passenger compartment, flexible means extending through said windshield mounting member and interconnecting said lever with said first latching member, and said lever having a range of movement between a first position corresponding to the latch disengaging position of said first latching member and a second position corresponding to the latch engaging retracted position of said first latching member wherein said flexible connecting means is carried beyond the pivotal axis of said actuating lever thereby locking said first latching member in its retracted latch engaging position.

10. In a convertible top latching mechanism as set forth in claim 8, said latch operating means including power means mountable in spaced relation to said windshield mounting member and remotely of said latching members, means operably connecting said power means through said windshield mounting member to actuate said first latching member between its latch engaging and disengaging positions, and control means accessible to the passenger compartment and selectively operable to energize said power means to engage and disengage said latching members.

11. In a convertible top latching mechanism as set forth in claim 8, said latch operating means including fluid pressure operated motor means, means embraced by said windshield mounting member and extending therethrough to operably connect said fluid pressure motor means to actuate said first latching member alternatively between its latch engaging and disengaging positions, and pressure supply control means including a control valve accessible to said passenger compartment and selectively operable to control the supply of pressurized actuating fluid to and from said motor means thereby selectively engaging and disengaging said latching members.

References Cited in the file of this patent

UNITED STATES PATENTS

| 2,741,503 | Thompson | Apr. 10, 1956 |
| 2,993,731 | Miles | July 25, 1961 |

FOREIGN PATENTS

| 1,113,961 | France | Dec. 12, 1955 |